United States Patent
Matsuura et al.

[11] Patent Number: 5,629,000
[45] Date of Patent: May 13, 1997

[54] HYDROGEN-ABSORBING ALLOY ELECTRODE FOR METAL HYDRIDE ALKALINE BATTERIES AND PROCESS FOR PRODUCING THE SAME

[75] Inventors: Yoshinori Matsuura; Mitsuzo Nogami; Mamoru Kimoto; Nobuyuki Higashiyama; Yasushi Kuroda; Ikuo Yonezu; Koji Nishio, all of Osaka; Toshihiko Saito, Mihara-gun, all of Japan

[73] Assignee: Sanyo Electric Co., Ltd., Osaka, Japan

[21] Appl. No.: 562,150

[22] Filed: Nov. 22, 1995

[30] Foreign Application Priority Data

Nov. 25, 1994 [JP] Japan .................. 6-315555
Sep. 13, 1995 [JP] Japan .................. 7-262096
Sep. 13, 1995 [JP] Japan .................. 7-262097
Oct. 2, 1995 [JP] Japan .................. 7-279685

[51] Int. Cl.$^6$ ........................ H01M 4/02
[52] U.S. Cl. ............... 429/218; 429/59; 429/101; 429/223; 429/224; 29/623.5; 420/900
[58] Field of Search .............. 429/59, 101, 218, 429/223, 224; 420/900, 449, 451, 459, 458, 580; 29/623.5

[56] References Cited

U.S. PATENT DOCUMENTS 5,219,678  6/1993  Hasebe et al. .............. 429/59
5,376,474  12/1994  Tadokoro et al. ............ 429/59
5,441,826  8/1995  Watanabe et al. ........... 429/101

FOREIGN PATENT DOCUMENTS 0420669   4/1991   European Pat. Off. .
0570957   11/1993  European Pat. Off. .
0588310   3/1994   European Pat. Off. .
0622860   11/1994  European Pat. Off. .
60-130054 7/1985   Japan .
63-264867 11/1988  Japan .
63-291363 11/1988  Japan .
94187980  8/1994   Japan .
07097648  4/1995   Japan .

*Primary Examiner*—M. Nuzzolillo
*Attorney, Agent, or Firm*—Birch, Stewart, Kolasch & Birch, LLP

[57] ABSTRACT

A hydrogen-absorbing alloy electrode for metal hydride alkaline batteries uses as hydrogen-absorbing material a powder of a rare earth element-nickel hydrogen-absorbing alloy obtained by pulverizing thin strips of said alloy prepared by single roll process and having an average thickness of 0.08 to 0.35 mm and a minimum size of crystal grains present in the roll-surface size of at least 0.2 μm and a maximum size of crystal grains in the open-surface side of not more than 20 μm. A process for producing the above electrode is also provided. The electrode can provide, when used as negative electrode, metal hydride alkaline batteries which are excellent in both high-rate discharge characteristics at an initial period of charge-discharge cycles and charge-discharge cycle characteristics.

26 Claims, 2 Drawing Sheets

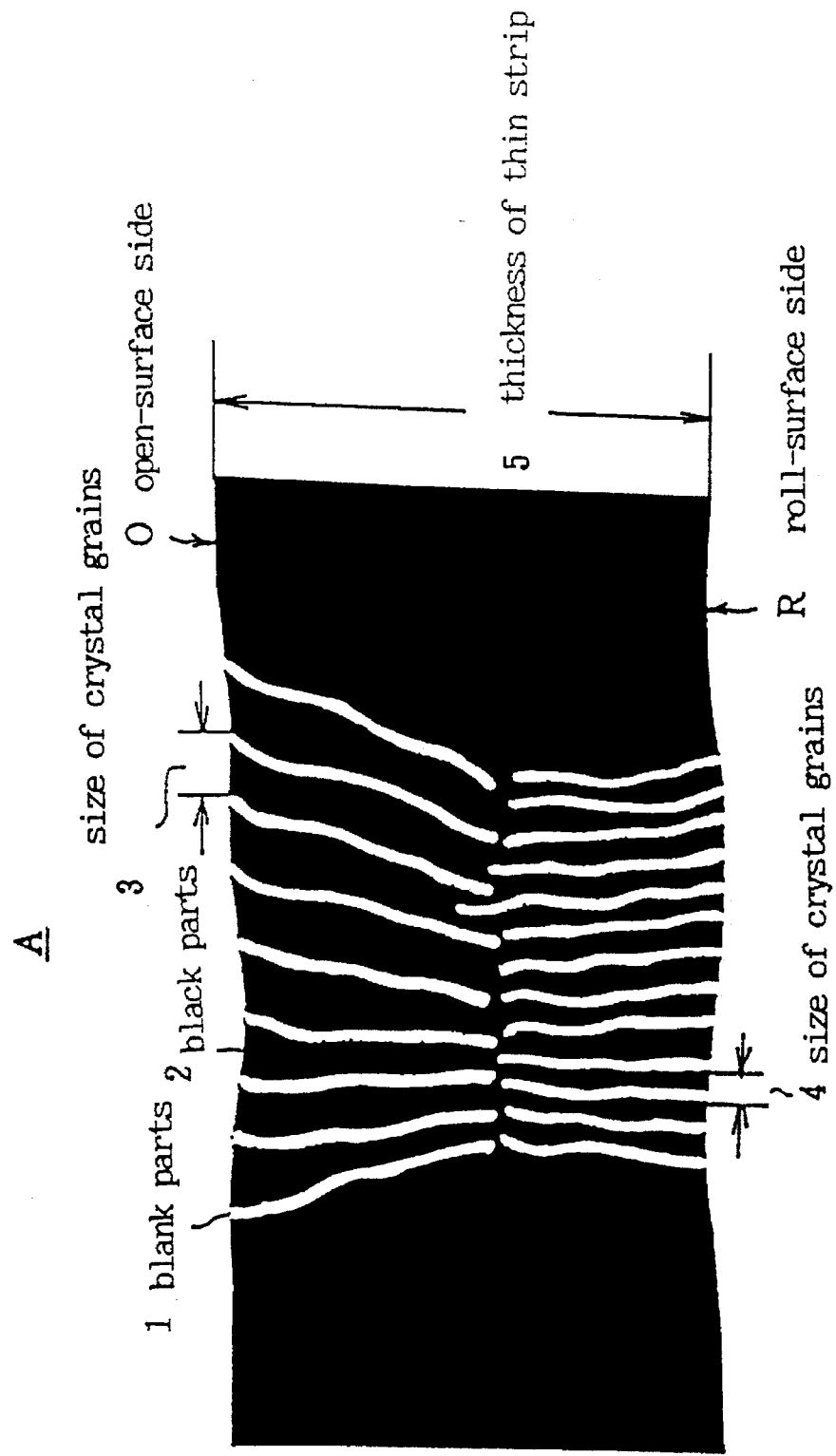

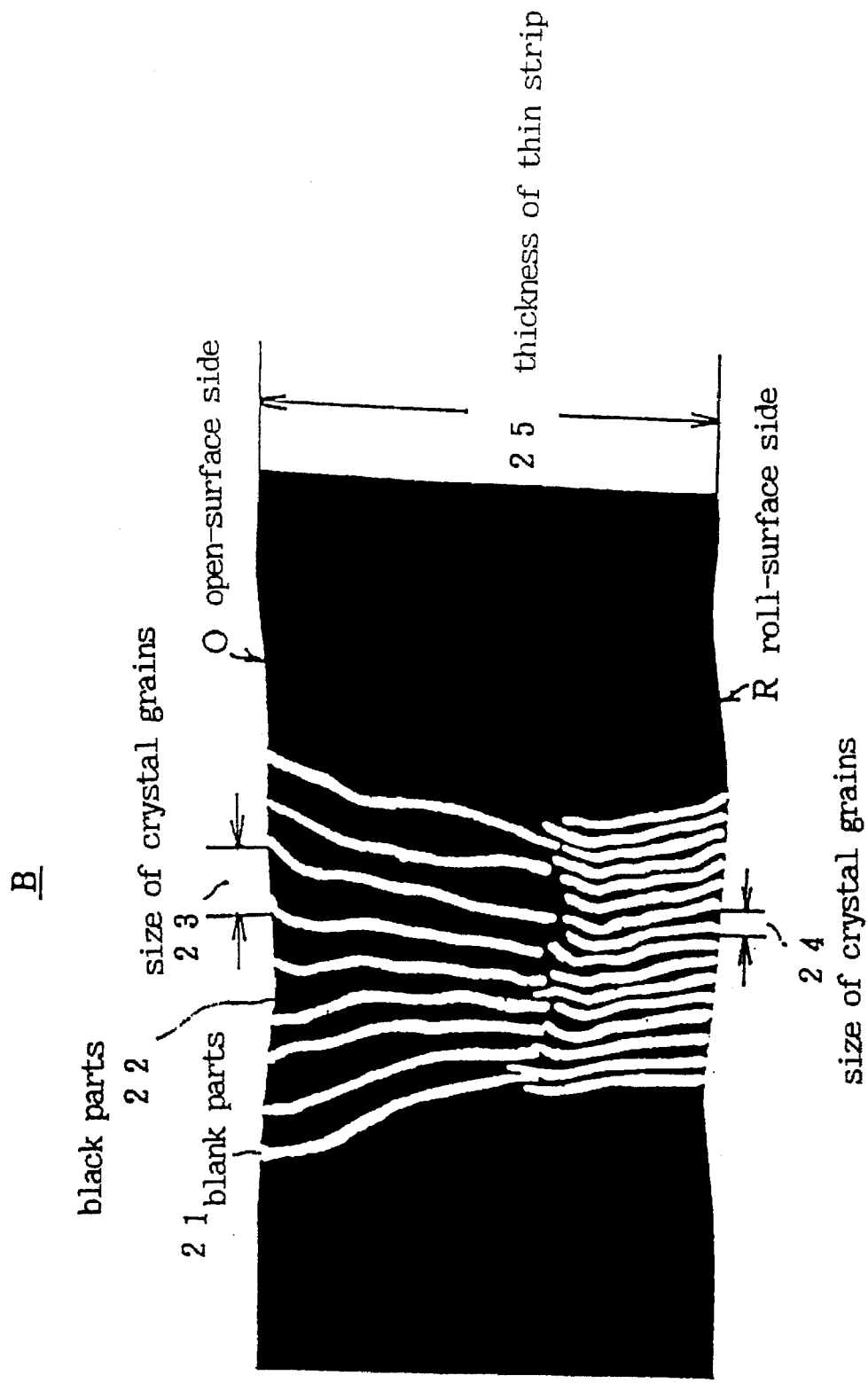

HYDROGEN-ABSORBING ALLOY ELECTRODE FOR METAL HYDRIDE ALKALINE BATTERIES AND PROCESS FOR PRODUCING THE SAME

BACKGROUND OF THE INVENTION

This application claims the priority of Japanese Patent Applications Serial No. 6-315555 filed on Nov. 25, 1994, Serial No. 7-262096 filed on Sep. 13, 1995, Serial No. 7-262097 filed on Sep. 13, 1995 and Serial No. 7-279685 filed on Oct. 2, 1995.

FIELD OF THE INVENTION

The present invention relates to a hydrogen-absorbing alloy electrode for metal hydride alkaline batteries and a process for producing the same. More specifically, the present invention relates to an improvement of a hydrogen-absorbing material of hydrogen-absorbing alloy, in order to obtain metal hydride alkaline batteries being excellent both in high-rate discharge characteristics at an initial period of charge-discharge cycles and in charge-discharge cycle characteristics.

DESCRIPTION OF THE PRIOR ART

In recent years, metal hydride alkaline batteries using a metal compound such as nickel hydroxide as positive electrode and a hydrogen-absorbing alloy, which is a novel material, as negative electrode have been attracting much attention as next-generation batteries which will replace nickel-cadmium batteries, since they have high energy density per unit weight or unit volume and can be provided with high capacity.

As the hydrogen-absorbing alloys for such metal hydride alkaline batteries, those obtained by solidifying an alloy melt in a die by cooling with water and then pulverizing the obtained solid are generally used (hereinafter this type hydrogen-absorbing alloy is called "conventional solidified alloy".

However, these conventional solidified alloys contain much segregation (irregular distribution of component elements) and hence the alloy particles crack on absorbing or discharging hydrogen during charge and discharge, thereby increasing the specific surface area. As a result, metal hydride alkaline batteries using a conventional solidified alloy as negative electrode material become indeed excellent in high-rate discharge characteristics at an initial period of charge-discharge cycles. On the other hand, they have the problem of having generally short life, since the segregation portions readily become starting points of oxidation degradation (corrosion).

In order to improve the cycle life, Japanese Patent Application Laid-open No. 89066/1985 proposed annealing (heating at a prescribed temperature for a prescribed time) a conventional solidified alloy and using the annealed alloy for negative electrode.

However, although an annealed conventional solidified alloy, having a low level of segregation, has a longer cycle life compared with one before annealing, its crystal grains become less crackable due to, in addition to the reduced segregation, the fact that the crystal grains have too large a size (sum of the thicknesses of two neighboring layers in a laminar structure in which the layers of the constituting rare earth element having a high concentration and those having a low concentration are present alternately). Consequently, the high-rate discharge characteristics at an initial period of charge-discharge cycles deteriorates markedly.

In view of the above problems, which are difficult to solve, associated with conventional solidified alloys, there has been in recent years proposed, as a negative electrode material for metal hydride batteries, a hydrogen-absorbing alloy obtained by what is known as "single roll process", which comprises jetting an alloy melt onto the peripheral surface of a roller rotating at a high speed to quench and solidify the melt (see, for example, Japanese Patent Application Laid-open No. 187979/1994).

The hydrogen-absorbing alloy prepared by the single roll process, i.e. by quenching and solidifying the corresponding alloy melt, is hardly influenced by a gravitational field and hence contains less segregation compared with conventional solidified alloys.

However, the crystal grains of the hydrogen-absorbing alloy prepared by the single roll process have nonuniform sizes. The alloy will therefore contain, as the charge-discharge cycle proceeds, readily crackable parts (open-surface side containing larger crystal grains) and less crackable parts (roll-surface side containing smaller crystal grains).

Japanese Patent Application Laid-open No. 291363/1988 describes that it is desirable to use as an electrode material a hydrogen-absorbing alloy powder obtained by pulverizing flakes of a hydrogen-absorbing alloy having a thickness of not more than 40 μm with crystal grains oriented along a certain crystal plane (seemingly (hk0) plane). However, this hydrogen-absorbing alloy, with which the selectively oriented plane appears on the surface of the alloy particles, have the problem of poor electrode catalytic activity and poor high-rate discharge characteristics at an initial period of charge-discharge cycles. In addition, use of flakes having a thickness of not more than 40 μm results in too fine alloy particles after pulverization, thereby increasing the contact resistance between the alloy particles. As a result, the rate of utilization of the hydrogen-absorbing alloy decreases and further the cycle life of the resulting electrode becomes short.

FIG. 2 is an enlarged cross-sectional view of a hydrogen-absorbing alloy B prepared by single roll process, which schematically shows the condition of crystal grains appearing, when the alloy is cut in the length direction of an alloy strip and along a plane perpendicular to the strip surface (only a part is shown). In the FIG., blank parts 21 show layers of the rare earth elements having a high concentration, while black parts 22 with those having a low concentration; and the sum of the thicknesses of the two neighboring layers is the size of crystal grains. 25 is the thickness of the thin strip. As seen from FIG. 2, the crystal grains present in the open-surface side O have a large size 23, and those in the roll-surface side R have a small size 24. While the open-surface side O with a large crystal grain size 23 readily cracks and becomes activated, the roll-surface side R with a small crystal grain size 24 does not crack easily and is difficult to activate. Consequently, the charge-discharge depth of the readily activatable open-surface side O becomes large, so that the hydrogen-absorbing alloy B tends to be finely pulverized upon repeated charge and discharge.

As stated above, metal hydride alkaline batteries using an hydrogen-absorbing alloy prepared by single roll process, which is readily pulverized into fine pieces on repetition of charge and discharge, have the disadvantage of short cycle life. There has been a strong demand for improvement of this disadvantage.

SUMMARY OF THE INVENTION

Accordingly, an object of the present invention is to provide a hydrogen-absorbing alloy electrode which can provide metal hydride alkaline batteries being excellent in both high-rate discharge characteristics at an initial period of charge-discharge cycles and charge-discharge cycle characteristics.

Another object of the present invention is to provide a process for producing the above electrode.

The present invention provides a hydrogen-absorbing alloy electrode for metal hydride alkaline batteries, which uses as hydrogen-absorbing material a powder of a rare earth element-nickel hydrogen-absorbing alloy obtained by pulverizing thin strips of said alloy prepared by single roll process and having an average thickness of 0.08 to 0.35 mm and a minimum size of crystal grains present in the roll-surface side of at least 0.2 μm and a maximum size of crystal grains in the open-surface side of not more than 20 μm, the size of crystal grains being as defined below:
the size of crystal grains is the sum of the thicknesses of two neighboring layers in a laminar structure in which the layers of constituting rare earth elements having a high concentration and those having a low concentration are present alternately.

The present invention further provides a hydrogen-absorbing alloy electrode for metal hydride alkaline batteries, which uses as hydrogen-absorbing material a powder of an Mm.Ni.Co.Al.Mn alloy (Mm: misch metal; R: Ni, Co, Al and Mn; and x is 4.5 to 4.9) obtained by pulverizing thin strips of said alloy prepared by single roll process and having an average thickness of 0.08 to 0.35 mm and a minimum size of crystal grains present in the roll-surface side of at least 0.2 μm and a maximum size of crystal grains in the open-surface side of not more than 18 μm, the size of crystal grains being as defined above.

The present invention still further provides a process for producing hydrogen-absorbing alloy electrodes for metal hydride alkaline batteries, which comprises the steps of: preparing a thin strip-like rare earth element-nickel hydrogen-absorbing alloy by permitting a melt of the alloy to flow onto the peripheral surface of a single roller rotating at a surface speed of 50 to 1,000 cm/sec in an inert gas or under vacuum; annealing said thin strip-like rare earth element-nickel hydrogen-absorbing alloy in an inert gas or under vacuum at a temperature of 620° to 1,000° C. for a prescribed time; pulverizing the annealed thin strip-like rare earth element-nickel hydrogen-absorbing alloy into a powder of the alloy; and preparing an electrode by using the obtained alloy powder as hydrogen-absorbing material.

The present invention yet further provides a process for producing hydrogen-absorbing alloy electrodes for metal hydride alkaline batteries, which comprises the steps of: preparing a thin strip-like Mm.Ni.Co.Al.Mn alloy represented by the general formula MmRx (Mm: misch metal; R: Ni, Co, Al and Mn; and x is 4.4 to 5.2) by permitting a melt of the alloy to flow onto the peripheral surface of a single roll rotating at a surface speed of 50 to 1,000 cm/sec in an inert gas or under vacuum; annealing said thin strip-like Mm.Ni.Co.Al.Mn alloy in an inert gas or under vacuum at a temperature of 750° to 950° C. for a prescribed time; pulverizing the annealed alloy strips into a powder of the alloy; and preparing an electrode by using the obtained alloy powder as hydrogen-absorbing material.

The electrodes of the present invention can, when used as a negative electrode, provide metal hydride alkaline batteries which are excellent in both high-rate discharge characteristics at an initial period of charge-discharge cycles and charge discharge cycle characteristics. According to the processes of the present invention, there can be obtained the electrodes of the present invention having such excellent electrode characteristics.

BRIEF DESCRIPTION OF THE DRAWINGS

A more complete appreciation and many of the attendant advantages thereof will be readily obtained as the same become better understood by reference to the following detailed description when considered in connection with the accompanying drawings wherein:

FIG. 1 is a schematic view showing the condition of crystal grains present in and appearing on the cross-section of a hydrogen-absorbing alloy having been quenched and solidified by single roll process and then annealed; and FIG. 2 is a schematic view showing the condition of crystal grains present in and appearing on the cross-section of a hydrogen-absorbing alloy having been quenched and solidified by single roll process and, thereafter, not annealed.

DETAILED DESCRIPTION OF THE PREFERRED EMBODIMENTS

The average thickness of the thin strip-like rare earth element-nickel hydrogen-absorbing alloy used in the present invention is restricted within the range of 0.08 to 0.35 mm for the following reasons. Use of thin strips having an average thickness exceeding 0.35 mm, in which crystal grains have nonuniform sizes in the thickness direction of the strips, shortens the cycle life. On the other hand, use of thin strips having an average thickness of less than 0.08 mm, in which the surface of alloy particles are oriented in (hk0) plane to deteriorate the catalytic activity of the electrode, decreases the high-rate discharge characteristics at an initial period of charge-discharge cycles and, besides, shortens the cycle life. The shortening of the cycle life is because: since the alloy particles constituting the electrode have a small particle size, the contact resistance between the alloy particles in the electrode increases, thereby decreasing the utilization rate of the hydrogen-absorbing alloy powder.

The minimum size of crystal grains of the rare earth element-nickel hydrogen-absorbing alloy used in the invention present in the roll-surface side and the maximum size thereof in the open-surface side are each restricted within the above range. Deviation from the range either decreases the high-rate discharge characteristics at an initial period of charge-discharge cycles or shortens the cycle life. That is, if a crystal grain having a size of less than 0.2 μm is present, together with larger particles, in the roll-surface side, the hydrogen-absorbing alloy will become hardly crackable, thereby decreasing the high-rate discharge characteristics at an initial period of charge-discharge cycles. On the other hand, if a crystal grain having a size exceeding 20 μm is present, together with smaller particles, in the open-surface side, the hydrogen-absorbing alloy will become readily finely pulverized finely and degradable by oxidation, thereby shortening the cycle life.

In order to obtain a hydrogen-absorbing alloy electrode capable of providing batteries having, besides excellent high-rate discharge characteristics at an initial period of charge-discharge cycles and charge-discharge characteristics, excellent internal-pressure characteristics, it is desirable to use a hydrogen-absorbing alloy having the following features. That is, the alloy powder preferably has an average particle diameter of 25 to 70 μm. More preferably, the alloy powder is one obtained by pulverizing a thin strip-like rare earth element-nickel hydrogen-absorbing alloy prepared by single roll process and then surface-treating the obtained powder by immersion in an acid solution and having an average diameter of 25 to 60 μm. Examples of the acid solution are aqueous solutions of hydrochloric acid, sulfuric acid and nitric acid.

With the average particle diameter exceeding 70 μm, the specific surface area becomes too small so that the oxygen generated on the positive electrode upon overcharge cannot be consumed through the hydrogen-absorbing alloy electrode (negative electrode). As a result, the internal pressure of the battery tends to increase. On the other hand, with a small average particle diameter of less than 25 μm, the alloy particles contact each other insufficiently, so that only part of the alloy particles can participate in the reaction. As a result, the heat of reaction increases and hence the battery internal pressure tends to increase.

The average particle diameter herein means a volume-weighted mean diameter MV as defined by the following formula (1). This volume-weighted mean diameter MV is introduced hereinto based on the consideration that, for any powder having a distribution of particle diameters, use of this value as representative diameter is more convenient as long as the effect of its particle diameter on a certain phenonmenon is the same as that produced by uniform particles having a diameter of MV.

$$MV = \Sigma(ViDi)/\Sigma Vi \qquad (1)$$

where Di=representative diameter of the i-th particle diameter fraction, and
Vi=volume ratio of the i-th particle diameter fraction Examples of the rare earth element-nickel alloy used the invention are Mm.Ni.Co.Al.Mn alloys represented by the general formula MmRx (Mm: Misch metal; R: Ni, Co, Al and Mn; x: 4.4 to 5.2).

The suitable Co content in the above Mm.Ni.Co.Al.Mn alloys is 0.4 to 0.9 mole per mole of Mm, and the suitable Ni content is 2.8 to 3.6 moles per mole of Mm.

In order to obtain a hydrogen-absorbing alloy electrode capable of providing batteries having, besides excellent high-rate discharge characteristics at an initial period of charge-discharge cycles and charge-discharge cycle characteristics, excellent resistance to overcharge, it is desirable to use a hydrogen-absorbing alloy powder obtained by pulverizing a thin strip-like Mm.Ni.Co.Al.Mn represented by the general formula MmRx (Mm: Misch metal; R: Ni, Co, Al and Mn; x: 4.4. to 4.9) having an average thickness of 0.08 to 0.35 mm and a minimum size of crystal grains present in the roll-surface side of at least 0.2 μm and a maximum size of crystal grains in the open-surface side of not more than 18 μm. In this case, the suitable Co content in the Mm.Ni.Co.Al.Mn alloys is 0.5 to 0.9 mole per mole of Mm, and the suitable Ni content is 2.9 to 3.3 moles per mole of Mm.

The electrode of the present invention can be obtained by, for example, the following process. That is, the process of the present invention comprises the steps of: preparing a thin strip-like rare earth element-nickel hydrogen-absorbing alloy by quenching and solidifying the alloy melt by single roll process in an inert gas or under vacuum at a roll surface speed of 50 to 1,000 cm/sec; annealing the thin strip-like rare earth element-nickel hydrogen-absorbing alloy in an inert gas or under vacuum at a temperature of 620° to 1,000° C.; pulverizing the annealed race earth element-nickel hydrogen-absorbing alloy into a powder of the alloy; mixing the alloy powder and a binder solution to obtain a slurry; and coating or impregnating a substrate (core) with the slurry. Specific examples of the core used in the invention are foamed porous metals, metal fibers, carbon fiber, metal meshes and perforated metals. Quenching and solidifying an alloy metal by single roll process at a roll surface speed of 50 to 1,000 cm/sec can permit the resulting thin strips to have a thickness of 0.08 to 0.35 mm. Annealing at a temperature of 620° to 1,000° C. after the quenching and solidification can permit the resulting crystal grains to have a minimum size of at least 0.2 μm and a maximum size of not more than 20 μm. In order to obtain crystal grains having a minimum size of at least 0.2 μm and a maximum size of not more than 18 μm, it is recommended to set the annealing temperature at 750° to 950° C.

The thickness of the above thin strip-like rare earth element-nickel hydrogen-absorbing alloy depends on the roll surface speed. The thickness decreases with increasing roll surface speed, i.e. increasing solidifying speed. The size of crystal grains depends on the annealing temperature. In general, elevating the annealing temperature results in an increased minimum crystal grain size but almost no change in the maximum size. In other words, elevating the annealing temperature decreases the dispersion of crystal grain sizes. If the annealing temperature exceeds 1,000° C. and gets close to the melting point of a hydrogen-absorbing alloy (about 1,200° C.), the alloy will partly re-melt at the grain boundary, thereby becoming very uncrackable and inactivated. The annealing time is about 1 to 10 hours. The annealing effect generally saturates after about 10 hours.

The thin strip-like rare earth element-nickel hydrogen-absorbing alloy used in the invention, having a small thickness of 0.08 to 0.35 mm, contains crystal grains having a uniform size throughout the thickness direction of the strips. The resulting alloy powder is therefore difficult to become finer during charge-discharge cycles. Since the lower limit of the strip thickness is set at at least 0.08 mm, the surface of the alloy particles is selectively oriented only to a small extent, so that the alloy has high electrode catalytic activity.

The rare earth element-nickel hydrogen-absorbing alloy used in the invention, containing no crystal grains which are too fine in the roll-surface side nor too coarse ones in the open-surface side, cracks to a moderate extent at an initial period of charge-discharge cycles and, nevertheless, does not become extremely fine upon repetition of charge-discharge cycles.

Accordingly, metal hydride alkaline batteries using the electrode of the present invention as the negative electrode are excellent in both high-rate discharge characteristics at an initial period of charge-discharge cycles and charge-discharge cycle characteristics.

In particular, use of a powder having an average particle diameter of 25 to 70 μm, preferably one surface-treated by immersion in an acid solution and having an average particle diameter after the treatment of 25 to 60 μm provides metal hydride alkaline batteries which are excellent not only in high-rate discharge characteristics at an initial period of charge-discharge cycles and charge-discharge cycle characteristics but in internal pressure characteristics.

EXAMPLES

Other features of the invention will become apparent in the course of the following detailed descriptions of exemplary embodiments which are given for illustration of the invention and are not intended to be limiting thereof.

EXAMPLES 1 THROUGH 13

Preparation of Hydrogen-Absorbing Alloy

Metals (all having a purity of at least 99.9%) constituting the alloy to prepare were each weighed and mixed together and the mixture was melted under vacuum in a high-frequency melting furnace. The melt was cooled by a single roll process (roll diameter: 350 mm) at various cooling rates as shown in Table 1 (roll surface speed: 50, 100, 300, 500 or 1,000 cm/sec) to give thin strip-like rare earth element-nickel hydrogen-absorbing alloys represented by the composition formula $MmNi_{3.4}Co_{0.8}Al_{0.3}Mn_{0.5}$ (strip length: about 30 to about 100 mm; strip width: about 20 to about 50 mm). Ten optional strips of each alloy were tested for thickness and the average was taken as the thickness of the alloy.

These rare earth element-nickel hydrogen-absorbing alloys were then annealed at various temperatures as shown in Table 1 (620°, 700°, 800°, 900°, 1,000° or 1,200° C.) in argon for 6 hours.

Each of the rare earth element-nickel hydrogen-absorbing alloys thus annealed was cut along the strip length and in a direction perpendicular to the strip surface. The reflected electron beam image of each cross-section was observed in a scanning electron microscope (JEOL866, made by JEOL Co.) to obtain the maximum size of crystal grains present in the open-surface side and the minimum size of those in the roll-surface side. The maximum size and minimum size of crystal grains were determined by measuring the distance between two neighboring blank lines, in a direction perpendicular thereto, observed on the reflected electron beam image (hereinafter the maximum and minimum sizes of crystal grains were obtained in the same manner). The maximum and minimum sizes of crystal grains as shown are average of measurements obtained with 10 samples for each rare earth element-nickel hydrogen-absorbing alloy.

FIG. 1 is a partial schematic view showing the condition of crystal grains appearing on the cross-section of the annealed thin strip-like hydrogen-absorbing alloy A. In the Figure, blank parts 1 show layers having a high concentration of rare earth elements and cobalt and a low concentration of manganese, and black parts 2 show layers having a low concentration of rare earth elements and cobalt and a high concentration of manganese. 3 shows the size of crystal grains present in the open-surface side O, while 4 that in the roll-surface side. 5 is the thickness of the thin strip. As seen from FIG. 1, the annealing had increased the size 4 of crystal grains in the roll-surface side, thereby reducing the difference between the size 4 and the size 3 of crystal grains in the open-surface side. As a result, the size distribution in the thickness direction the thin strip became more uniform than that of the hydrogen-absorbing alloy B before annealing (see FIG. 2).

Preparation of Hydrogen-Absorbing Alloy Electrodes

Each of the annealed rare earth element-nickel hydrogen-absorbing alloys was mechanically pulverized under an atmosphere of an inert gas (argon) and the obtained powders were sieved into powders having a maximum particle diameter of 100 mesh (in the Examples and Comparative Examples that follow, the maximum particle diameters were all adjusted at 100 mesh) and an average particle diameter (volume-weighted average diameter) of 70 μm. The average particle diameter was obtained by 2-point method [i=2 in the above equation (1)]. Further this average particle diameter was obtained by measuring particle size distribution by laser diffraction method with a laser light, which uses the Fraunhofer diffraction phenomenon. The measurement was conducted with a microtruck particle size analyzer (Type 7991, made by Leeds & Northrup Co.). Slurries were then prepared by mixing 90 parts by weight of each of the powders thus obtained and 10 parts by weight of 2.5% aqueous solution of polyethylene oxide.

These slurries were each applied on a perforated metal of nickel-plated iron and dried, to prepare hydrogen-absorbing alloy electrodes.

Preparation of Nickel Hydride Alkaline Batteries

AA-size nickel hydride alkaline batteries of positive electrode-dominating type (battery capacity: 1,200±10 mAh) A1 through A13 were prepared with the above hydrogen-absorbing alloy electrodes. A known sintered nickel electrode, a polyamide nonwoven fabric and a 30% aqueous potassium hydroxide solution were used as the positive electrode, separator and alkaline electrolyte, respectively.

Table 1 shows the alloy preparation conditions (roll surface speed and annealing temperature) used in Examples 1 through 13, the average particle diameter of the alloy powders prepared, the thickness of the thin strips and the maximum and minimum crystal grain sizes.

TABLE 1

|  | Roll surface speed (cm/sec) | Thickness of thin strips (mm) | Annealing temperature (°C.) | Size of crystal grains (μm) Min. | Size of crystal grains (μm) Max. | Average particle diameter (μm) | High-rate discharge capacity (mAh) | Cycle life (times) |
|---|---|---|---|---|---|---|---|---|
| Battery A1 | 50 | 0.35 | 700 | 0.2 | 20 | 70 | 970 | 650 |
| Battery A2 | 50 | 0.35 | 900 | 0.35 | 15 | 70 | 930 | 660 |
| Battery A3 | 100 | 0.27 | 700 | 0.2 | 15 | 70 | 980 | 650 |
| Battery A4 | 100 | 0.27 | 800 | 0.25 | 12 | 70 | 970 | 630 |
| Battery A5 | 100 | 0.27 | 900 | 0.35 | 12 | 70 | 940 | 640 |
| Battery A6 | 300 | 0.23 | 620 | 0.2 | 15 | 70 | 990 | 660 |
| Battery A7 | 300 | 0.23 | 700 | 0.2 | 13 | 70 | 920 | 630 |
| Battery A8 | 300 | 0.23 | 900 | 0.2 | 15 | 70 | 960 | 620 |
| Battery A9 | 300 | 0.23 | 1,000 | 0.2 | 13 | 70 | 930 | 640 |
| Battery A10 | 500 | 0.15 | 700 | 0.2 | 10 | 70 | 920 | 670 |
| Battery A11 | 500 | 0.15 | 900 | 0.25 | 9 | 70 | 920 | 630 |
| Battery A12 | 1,000 | 0.08 | 700 | 0.2 | 8 | 70 | 940 | 620 |
| Battery A13 | 1,000 | 0.08 | 900 | 0.3 | 9 | 70 | 930 | 600 |

Comparative Example 1

The same procedure as in Examples 1 through 13 was followed except that conventional solidification process was used instead of single roll process, to prepare a block-like rare earth element-nickel hydrogen-absorbing alloy having the same composition.

The alloy thus obtained was then annealed at 900° C. for 6 hours (in the Examples and Comparative Examples that follow, the same annealing time of 6 hours was used) and, thereafter, mechanically pulverized and sieved, to give a powder having an average particle diameter of 70 μm and a maximum and minimum crystal grain size of 35 μm and 10 μm respectively.

Battery B1 was prepared in the same manner as in Examples 1 through 13 except for using, as hydrogen-absorbing material, the powder thus obtained.

Comparative Example 2

The same procedure as in Examples 1 through 13 was followed except that the roll surface speed was changed to 10 cm/sec and that the annealing temperature was set at 900° C., to prepare a powder having an average particle diameter of 70 μm, an average thickness of 0.57 mm, a maximum crystal grain size in the open-surface side of 40 μm and a minimum crystal grain size in the roll-surface side of 0.2 μm.

Battery B2 was prepared in the same manner as in Examples 1 through 13 except for using, as hydrogen-absorbing material, the powder thus obtained.

Comparative Example 3

The same procedure as in Examples 1 through 13 was followed except that the roll surface speed was changed to 300 cm/sec and that the annealing temperature was set at 500° C., to prepare a powder having an average particle diameter of 70 μm, an average thickness of 0.23 mm, a maximum crystal grain size in the open-surface side of 15 μm and a minimum crystal grain size in the roll-surface side of not more than 0.01 μm.

Battery B3 was prepared in the same manner as in Examples 1 through 13 except for using, as hydrogen-absorbing material, the powder thus obtained.

Comparative Example 4

The same procedure as in Examples 1 through 13 was followed except that the roll surface speed was changed to 300 cm/sec and that the annealing temperature was set at 1200° C., to prepare a powder having an average particle diameter of 70 μm, an average thickness of 0.23 mm, a maximum crystal grain size in the open-surface side of 25 μm and a minimum crystal grain size in the roll-surface side of 0.4 μm.

Battery B4 was prepared in the same manner as in Examples 1 through 13 except for using, as hydrogen-absorbing material, the powder thus obtained.

Comparative Example 5

The same procedure as in Examples 1 through 13 was followed except that conventional solidification process (water-cooling solidification) was used instead of single roll process and that annealing was not conducted, to prepare a powder having an average particle diameter of 70 μm and a maximum and minimum crystal grain sizes of 25 μm and 7 μm, respectively.

Battery B5 was prepared in the same manner as in Examples 1 through 13 except for using, as hydrogen-absorbing material, the powder thus obtained.

Comparative Example 6

The same procedure as in. Examples 1 through 13 was followed except that the roll surface speed was changed to 300 cm/sec and that annealing was not conducted, to prepare a powder having an average particle diameter of 70 μm, an average thickness of 0.23 mm, a maximum crystal grain size in the open-surface side of 10 μm and a minimum crystal grain size in the roll-surface side of not more than 0.1 μm.

Battery B6 was prepared in the same manner as in Examples 1 through 13 except for using, as hydrogen-absorbing material, the powder thus obtained.

Comparative Example 7

The same alloy melt ($MmNi_{3.4}Co_{0.8}Al_{0.3}Mn_{0.5}$) as used in Examples 1 through 13 was solidified by gas atomization process and then annealed at 900° C. for 6 hours, to give a hydrogen-absorbing alloy powder. The average particle diameter and the maximum and minimum crystal grain sizes were 70 μm, 8 μm and 0.1 μm, respectively.

Battery B7 was prepared in the same manner as in Examples 1 through 13 except for using as hydrogen-absorbing material, the powder thus obtained.

Comparative Example 8

The same procedure as in Examples 1 through 13 was followed except that the roll surface speed was changed to 1,500 cm/sec and that the annealing temperature was set at 900° C., to prepare a powder having an average particle diameter of 70 μm, an average thickness of 0.06 mm, a maximum crystal grain size in the open-surface side of 5 μm and a minimum crystal grain size in the roll-surface side of 0.2 μm.

Battery B8 was prepared in the same manner as in Examples 1 through 13 except for using, as hydrogen-absorbing material, the powder thus obtained.

Comparative Example 9

The same procedure as in Examples 1 through 13 was followed except that the roll surface speed was changed to 3,000 cm/sec (roll diameter: 150 mm) and that the annealing temperature was set at 900° C., to prepare a powder having an average particle diameter of 55 μm, an average thickness of 0.04 mm, a maximum crystal grain size in the open-surface side of 2 μm and a minimum crystal grain size in the roll-surface side of 0.2 μm. The average particle diameter could not reach 70 μm, because of the high roll surface speed of 3,000 cm/sec.

Battery B9 was prepared in the same manner as in Examples 1 through 13 except for using, as hydrogen-absorbing material, the powder thus obtained.

Comparative Example 10

The same procedure as in Examples 1 through 13 was followed except that the roll surface speed was changed to 5,000 cm/sec (roll diameter: 150 mm) and that the annealing temperature was set at 900° C., to prepare a powder having an average particle diameter of 48 μm, an average thickness of 0.03 mm, a maximum crystal grain size in the open-surface side of 2 μm and a minimum crystal grain size in the roll-surface side of 0.15 μm. The average particle diameter could not reach 70 μm, because of the high roll surface speed of 5,000 cm/sec.

Battery B10 was prepared in the same manner as in Examples 1 through 13 except for using, as hydrogen-absorbing material, the powder thus obtained.

Table 2 shows the alloy preparation conditions (roll surface speed and annealing temperature) used in Comparative Examples 1 through 10, the average particle diameter of the alloy powders prepared, the thickness of the thin strips and the maximum and minimum crystal grain sizes.

Battery B1, though a long cycle life, has a small high-rate discharge capacity at an initial period of charge-discharge cycles. This is attributable to the fact that segregation had been diminished because of uniform Mn distribution and

TABLE 2

| | Roll surface speed | Thickness of thin strips | Annealing tempera- | Size of crystal grains (μm) | | Average particle diameter | High-rate discharge capacity | Cycle life |
|---|---|---|---|---|---|---|---|---|
| | (cm/sec) | (mm) | ture (°C.) | Min. | Max. | (μm) | (mAh) | (times) |
| Battery B1 | c.s.* | — | 900 | 10 | 35 | 70 | 340 | 660 |
| Battery B2 | 10 | 0.57 | 900 | 0.2 | 40 | 70 | 1,000 | 310 |
| Battery B3 | 300 | 0.23 | 500 | 0.1 or below | 15 | 70 | 1,000 | 280 |
| Battery B4 | 300 | 0.23 | 1,200 | 0.4 | 25 | 70 | 320 | 360 |
| Battery B5 | c.s.* | — | — | 7 | 25 | 70 | 990 | 180 |
| Battery B6 | 300 | 0.23 | — | 0.1 or below | 10 | 70 | 820 | 200 |
| Battery B7 | g.a.** | — | 900 | 0.1 | 8 | 70 | 750 | 280 |
| Battery B8 | 1,500 | 0.06 | 900 | 0.2 | 5 | 70 | 780 | 530 |
| Battery B9 | 3,000 | 0.04 | 900 | 0.2 | 2 | 55 | 520 | 380 |
| Battery B10 | 5,000 | 0.03 | 900 | 0.15 | 2 | 48 | 480 | 240 |

Only Batteries B9 and B10 used a 150 mm-dia. roll.
*conventional solidification process
**gas atomization process High-Rate Discharge Capacity at an Initial Period of Charge-Discharge Cycles Batteries A1 through A13 and B1 through B10 were activated by charging at 120 mA at a room temperature (about 25° C.) for 16 hours and then discharging at 120 mA to a voltage of 0.95 V.

Thereafter, each of the batteries was charged at 1,200 mA for 1.1 hours and discharged at 4.8 A to 0.95 V, to obtain high-rate discharge capacity. The high-rate discharge capacity was determined on 3 pieces for each battery and the average was taken as the high-rate discharge capacity of the battery. The results are shown in Tables 1 and 2 above.

Cycle Life

Batteries A1 through A13 and B1 through B10 were, after being activated under the same conditions as above, subjected to a charge-discharge cycle test, in which each cycle consists of charging at 1,200 mA at room temperature for 1.1 hours, resting for 1 hour and then discharging at 1,200 mA to 1.0 V, in order to test for their cycle lives. This test was conducted on 10 pieces of each battery and, with the shortest life and the longest life being omitted, the average of the residual 8 results was taken as its cycle life. The cycle life was obtained in terms of the number of cycles (times) until the battery capacity decreased to 960 mAh or below. The results are shown in Tables 1 and 2 above.

While Batteries A1 through A13 shown in Table 1 have not only excellent high-rate discharge characteristics at an initial period of charge-discharge cycles but long cycle lives, Batteries B1 through B10 are inferior either in high-rate discharge characteristics at an initial period of charge-discharge cycles or in cycle life, or in both.

The excellent high-rate discharge characteristics at an initial period of charge-discharge cycles and long cycle lives of Batteries A1 through A13 are attributable to the fact that the hydrogen-absorbing alloy used for negative electrode contains less segregation and contains no too small or too large crystal grains.

that the crystal grains had become too large, so that the hydrogen-absorbing alloy became less crackable.

Battery B2, having a large high-rate discharge capacity at an initial period of charge-discharge cycles though, has a short cycle life. This is attributable to the following fact. While the open-surface side, which is readily crackable, is easily activated, the roll-surface side is less crackable and hence less active. As a result, the charge-discharge depth of the open-surface side became large and the hydrogen-absorbing alloy broke into fine pieces.

Battery B3, though having a large high-rate discharge capacity at an initial period of charge-discharge cycles, has a short cycle life. This is attributable to the fact that the too low annealing temperature permitted insufficiently activated parts to remain, so that the charge-discharge depth of activated part became large and hence the hydrogen-absorbing alloy broke into fine pieces.

Battery B4 has a small high-rate discharge capacity at an initial period of charge-discharge cycles and a short cycle life. The small high-rate discharge capacity at an initial period of charge-discharge cycles is attributable to the fact that: because of the annealing temperature having been close to the melting point of the hydrogen-absorbing alloy, the alloy partially re-melted at grain boundaries, thereby becoming very uncrackable and less active. The short cycle life is attributable to the utilization rate of the hydrogen-absorbing alloy having decreased as the alloy became less active.

Battery B5, though having a large high-rate discharge capacity at an initial period of charge-discharge cycles, has a short cycle life. The short cycle life is attributable to the fact that: although possessing large crystal grains, the hydrogen-absorbing alloy contained segregation of Mn because it had not been annealed.

Battery B6, though having a large high-rate discharge capacity at an initial period of charge-discharge cycles, has a short cycle life. This is attributable to the following fact. While the open-surface side, which was readily crackable, was easily activated, the roll-surface side is less crackable and hence less active. As a result, the charge-discharge depth of the open-surface side became large and the hydrogen-absorbing alloy broke into fine pieces.

Battery B7 has a small high-rate discharge capacity at an initial period of charge-discharge cycles and a short cycle life. The short cycle life is attributable to the following fact. The alloy, having been solidified by gas atomization, had a large dispersion of grain size distribution. Upon annealing, such crystal grains having different sizes, in particular small grains having a size of 30 μm had been poorly activated, so that the utilization rate of the entire alloy became worse.

Battery B8 has a small high-rate discharge capacity at an initial period of charge-discharge cycles and a short cycle life. The small high-rate discharge capacity at an initial period or charge-discharge cycles is attributable to the fact that: since the roll-surface side of the alloy had a strong selective orientation in the (hk0) plane, a sufficient degree of activation could not be obtained, even if the minimum size of crystal grains in the roll-surface side had become as large as 0.2 by annealing. The short cycle life is attributable to the following fact. The alloy, although using an alloy powder having an average particle diameter of 70 μm, had a low strip thickness of 0.06 mm (60 μm), thereby containing many flat-shaped particles. As a result, the contact resistance between alloy particles became large, so that the utilization rate of the entire alloy decreased.

Batteries B9 and B10, both using alloy powders obtained by pulverizing still thinner strips than those used for Battery B8, have a smaller high-rate discharge capacity at an initial period of charge-discharge cycles and a shorter cycle life than those of Battery B8.

Relationship Between the Co Content in
Mm.Ni.Co.Al.Mn Alloy and the High-Rate
Discharge Capacity at an Initial Period of the
Charge-Discharge Cycles and Cycle Life The procedure of Example 8 (roll surface speed: 300 cm/sec; annealing temperature: 900° C.) was followed except for changing the Co content in the alloy to various levels, to prepare 7 types of hydrogen-absorbing alloy powders (average particle diameter: 70 μm) represented by composition formula $MmNi_{4.2-y}Co_yAl_{0.3}Mn_{0.5}$ (y=0.3, 0.4, 0.5, 0.6, 0.7, 0.9 or 1.0).

Table 3 shows the conditions of preparing the alloy powders (roll surface speed and annealing temperature), the average particle diameter of the alloy powders, the thickness of thin strips and the maximum and minimum sizes of crystal grains.

Then, hydrogen-absorbing alloy electrodes and nickel hydride alkaline batteries were prepared in the same manner as in Example 8 except for using these hydrogen-absorbing alloy powders as hydrogen-absorbing material.

The nickel hydride alkaline batteries thus prepared were subjected to the high-rate discharge test and charge-discharge cycle test under the same conditions as above, in order to study their high-rate discharge characteristics at an initial period or charge-discharge cycles and cycle life. The results are shown in Table 3, which also includes the results obtained with Battery A8.

It is understood from Table 3 that, with Mm.Ni.Co.Al.Mn alloys, in order to obtain a nickel hydride alkaline batteries being excellent in both of high-rate discharge characteristics at an initial period or charge-discharge cycles and charge-discharge cycle characteristics, Cobalt is desirably contained in an amount or 0.4 to 0.9 mole per mole of Mm.

Relationship Between the Ni Content of
Mm.Ni.Co.Al.Mn Alloy and the High-Rate
Discharge Capacity at an Initial Period or the
Charge-Discharge Cycles and Cycle Life The procedure of Example 8 (roll surface speed: 300 cm/sec; annealing temperature: 900° C.) was followed except for changing the Ni content in the alloy to various levels, to prepare 5 types of hydrogen-absorbing alloy powders (average particle diameter: 70 μm) represented by composition formula $MmNi_zCo_{0.8}Al_{0.3}Mn_{0.5}$ (z=2.6, 2.8, 3.2, 3.6 or 3.8)

Table 4 shows the conditions of preparing the alloy powders (roll surface speed and annealing temperature), the average particle diameter of the alloy powders, the thickness of thin strips and the maximum and minimum sizes of crystal grains.

TABLE 3

| "y" of $MmNi_{4.2-y}$ $Co_yAl_{0.3}$ $Mn_{0.5}$ | Roll surface speed (cm/sec) | Thickness of thin strips (mm) | Annealing temperature (°C.) | Size of crystal grains (μm) | | Average particle diameter (μm) | High-rate discharge capacity (mAh) | Cycle life (times) |
|---|---|---|---|---|---|---|---|---|
| | | | | Min. | Max. | | | |
| 0.35 | 300 | 0.23 | 900 | 0.2 | 17 | 70 | 1,000 | 490 |
| 0.4 | 300 | 0.23 | 900 | 0.2 | 14 | 70 | 1,000 | 500 |
| 0.5 | 300 | 0.22 | 900 | 0.2 | 15 | 70 | 1,000 | 530 |
| 0.6 | 300 | 0.23 | 900 | 0.2 | 13 | 70 | 980 | 550 |
| 0.7 | 300 | 0.24 | 900 | 0.2 | 18 | 70 | 970 | 590 |
| 0.8 | 300 | 0.23 | 900 | 0.2 | 15 | 70 | 960 | 620 |
| 0.9 | 300 | 0.23 | 900 | 0.2 | 16 | 70 | 930 | 750 |
| 0.95 | 300 | 0.24 | 900 | 0.2 | 19 | 70 | 810 | 800 |

TABLE 4

| "z" of $MmNi_zCo_{0.8}Al_{0.3}Mn_{0.5}$ | Roll surface speed (cm/sec) | Thickness of thin strips (mm) | Annealing temperature (°C.) | Size of crystal grains (μm) Min. | Size of crystal grains (μm) Max. | Average particle diameter (μm) | High-rate discharge capacity (mAh) | Cycle life (times) |
|---|---|---|---|---|---|---|---|---|
| 2.6 | 300 | 0.24 | 900 | 0.25 | 16 | 70 | 1,000 | 520 |
| 2.8 | 300 | 0.23 | 900 | 0.25 | 15 | 70 | 1,000 | 580 |
| 3.2 | 300 | 0.25 | 900 | 0.25 | 17 | 70 | 980 | 630 |
| 3.4 | 300 | 0.23 | 900 | 0.2 | 15 | 70 | 960 | 620 |
| 3.6 | 300 | 0.26 | 900 | 0.2 | 18 | 70 | 980 | 570 |
| 3.8 | 300 | 0.25 | 900 | 0.2 | 18 | 70 | 1,000 | 510 |

Then, hydrogen-absorbing alloy electrodes and nickel hydride alkaline batteries were prepared in the same manner as in Example 8 except for using these hydrogen-absorbing alloy powders as hydrogen-absorbing material.

The nickel hydride alkaline batteries thus prepared were subjected to the high-rate discharge test and charge-discharge cycle test under the same conditions as above, to study their high-rate discharge characteristics at an initial period of charge-discharge cycles and cycle life. The results are shown in Table 4, which also includes the results obtained with Battery A8.

It is understood from Table 4 that, with Mn.Ni.Co.Al.Mn alloys, in order to obtain a nickel hydride alkaline batteries being excellent in both of high-rate discharge characteristics at an initial period of charge-discharge cycles and charge-discharge cycle characteristics, nickel is desirably contained in an amount of 2.8 to 3.6 moles per mole of Mm.

Relationship Between the Average Particle Diameter of Alloy Powder and the Internal Pressure Characteristics of Battery Metals (all having a purity of at least 99.9%) constituting the alloy to prepare were each weighed and mixed together and the mixture was melted under vacuum in a high-frequency melting furnace. The melt was cooled by single roll process (roll diameter: 350 mm) at a roll surface speed of 300 cm/sec, to give a thin strip-like rare earth element-nickel hydrogen-absorbing alloy represented by composition formula $MmNi_{3.1}Co_{0.8}Al_{0.3}Mn_{0.5}$.

The rare earth element-nickel hydrogen-absorbing alloy thus obtained was then annealed at 900° C. for 6 hours and then mechanically pulverized under an atmosphere of an inert gas (argon) and sieved, to give hydrogen-absorbing alloy powders having various average particle diameters and having a maximum size of crystal grains in the open-surface side of 13 μm and a minimum size of those in the roll-surface side of 0.25 μm and an average thickness of thin strips of 0.23 mm.

AA-size nickel hydride alkaline batteries of positive electrode-dominating type (battery capacity: 1,200±10 mAh) A14 through A29 were prepared in the same manner as in Examples 1 through 13 except for using these hydrogen-absorbing powders as hydrogen-absorbing material. Among these batteries, A20 through A25 and A28 and A29 were prepared with the rare earth element-nickel hydrogen absorbing alloy powders having been further treated as follows. That is, the powders were each immersed in an aqueous hydrochloric acid solution having a pH of 0.5 and, after the mixture had been stirred to a pH of 7, taken out, washed with pure water and dried.

Separately, a block-like rare earth element-nickel hydrogen-absorbing alloy having the same composition was prepared by conventional solidification process, instead of single roll process. The alloy thus obtained was then annealed at 900° C. for 6 hours, mechanically pulverized and sieved, to give powders having various average particle diameters. Batteries B11 through B15 were prepared using these powders in the same manner as above.

Internal Pressure Characteristics of Battery

Batteries A14 through A29 and B11 through B15 were activated by charging at 120 mA at room temperature (about 25° C.) for 16 hours and then discharging at 60° C. and 120 mA to 0.95 V.

Each of the batteries was fitted with a pressure gauge on the can bottom and then charged at room temperature and at 1200 mA (1C), The charging time (minutes) required for the battery internal pressure to elevate to 10 kg/cm² was measured. For each battery, 4 pieces were tested for the charging time and the average of the 4 measurements was taken as an index of battery internal pressure characteristics. Table 5 shows the average particle diameter (μm) of the alloy powder used for each battery and the average charging time (minutes). The average particle diameters of surface-treated powders with acid are those after the treatment.

TABLE 5

| | Average particle diameter (μm) | Battery internal pressure characteristics (minutes) Not acid-treated | | Battery internal pressure characteristics (minutes) Acid-treated | |
|---|---|---|---|---|---|
| Single roll process | 70 | A14 | 110 | A20 | 110 |
| | 60 | A15 | 115 | A21 | 120 |
| | 55 | A16 | 120 | A22 | 125 |
| | 45 | A17 | 120 | A23 | 130 |
| | 35 | A18 | 115 | A24 | 130 |
| | 25 | A19 | 110 | A25 | 115 |
| | 80 | A26 | 80 | A28 | 70 |
| | 20 | A27 | 70 | A29 | 60 |
| Conventional solidification | 90 | B11 | 60 | | |
| | 85 | B12 | 85 | | |
| | 80 | B13 | 85 | | |
| | 70 | B14 | 65 | | |
| | 65 | B15 | 60 | | |

As seen from Table 5, Batteries A14 through A25 have longer charging time until the internal pressure reaches 10 kg/cm², i.e. better battery internal pressure characteristics compared with Batteries A26 through A29 and Batteries B11 through B15. To summarize this result and the previous results, it is understood that use, as hydrogen-absorbing material, of an alloy powder having an average particle diameter of 25 to 70 μm obtained by pulverizing a thin strip-like rare earth element-nickel hydrogen-absorbing alloy prepared by single roll process and having an average thickness of 0.08 to 0.35 mm and a minimum crystal grain size of the roll-surface side of at least 0.2 μm and a maximum crystal grain size of the open-surface side of not more than 20 μm can yield a hydrogen-absorbing alloy electrode which will provide metal hydride alkaline batteries being excellent not only in high-rate discharge characteristics and charge-discharge cycle characteristics but in battery internal pressure characteristics.

The poor battery internal pressure characteristics of Battery A29, which used an alloy powder having an average particle diameter of 20 μm, is considered to be due to the following fact. The surface treatment had removed oxides, thereby causing the surface of alloy particles to become smooth, which worsened the contact between the alloy particles. As a result, only part of the alloy powder was able to participate in the reaction, so that the reaction heat elevated, which caused hydrogen to dissociate readily.

The poor battery internal pressure characteristics of Battery A28, which used an alloy powder having an average particle diameter of 80 μm, is considered to be due to the following fact. The surface treatment had removed oxides to smooth out the projections and recesses on the surface of the alloy particles to a certain degree, thereby further decreasing the specific surface area of the alloy powder. As a result, the reaction was effected only on a small, limited surface, so that the reaction heat elevated, which caused hydrogen to dissociate readily.

Among Batteries A14 through A25, those A21 through A25 are found to be particularly improved in the battery internal pressure characteristics. This fact shows that it is more desirable, in order to improve battery internal pressure characteristics, to use as hydrogen-absorbing material an alloy powder having an average particle diameter of 25 to 60 μm and obtained by pulverizing a thin strip-like alloy and further surface-treating the resulting powder by immersion in an acidified liquid. Batteries B11 through B15, using conventional solidified alloys, have poor battery internal pressure characteristics. This is considered to be due to the fact that the conventional solidified alloys had more marked segregation of Mn and the like as compared with quench-solidified alloys, thereby becoming readily crackable and oxidizable, so that consumption of oxygen could not proceed rapidly.

Although the above descriptions of the Examples have been made by reference to Mm.Ni.Co.Al.Mn alloys, the present invention is widely applicable to hydrogen-absorbing alloy electrodes using any rare earth element-nickel hydrogen-absorbing alloy as hydrogen-absorbing material, since rare earth element-nickel hydrogen-absorbing alloys have the tendency of, when solidified, having a similar distribution of constituting rare earth elements.

Relationship Between the x in MmRx (The Stoichiometric Ratio Between R and Mm) and Anti-Overcharge Characteristics Metals (all having a purity of at least 99.9%) constituting the alloys to prepare were each weighed and mixed together and the obtained mixtures were melted under vacuum in a high-frequency melting furnace. The melts were cooled by single roll process (roll diameter: 350 mm) at a roll surface speed of 300 cm/sec, to give 8 types of thin strip-like rare earth element-nickel hydrogen-absorbing alloys represented by the following composition formulas:

$MmNi_{3.6}Co_{0.8}Al_{0.3}Mn_{0.5}$ (x=5.2 in MmRx),
$MmNi_{3.3}Co_{0.8}Al_{0.3}Mn_{0.5}$ (x=4.9 in MmRx),
$MmNi_{3.2}Co_{0.8}Al_{0.3}Mn_{0.5}$ (x=4.8 in MmRx),
$MmNi_{3.1}Co_{0.8}Al_{0.3}Mn_{0.5}$ (x=4.7 in MmRx), $MmNi_{3.0}Co_{0.8}Al_{0.3}Mn_{0.5}$ (x=4.6 in MmRx),
$MmNi_{2.9}Co_{0.8}Al_{0.3}Mn_{0.5}$ (x=4.5 in MmRx),
$MmNi_{2.8}Co_{0.8}Al_{0.3}Mn_{0.5}$ (x=4.4 in MmRx) and
$MmNi_{2.6}Co_{0.8}Al_{0.3}Mn_{0.5}$ (x=4.2 in MmRx).

The thin strip-like Mm.Ni.Co.Al.Mn alloys thus obtained were annealed at 900° C. in argon for 6 hours and then mechanically pulverized under an atmosphere of an inert gas (argon), to give alloy powders having an average particle diameter of 70 μm. Table 6 shows the stoichiometric ratio x (x in MmRx), the molar ratio of Ni to Mm, the thickness of thin strips and the maximum and minimum crystal grain sizes, of the alloys thus prepared.

TABLE 6

| Battery | Stoichiometric ratio of alloy, x | Molar ratio of Ni to Mm | Thickness of thin strips (mm) | Size of crystal grain (μm) | | Average of charge-discharge cycles (times) |
|---|---|---|---|---|---|---|
| | | | | min. | max. | |
| A30 | 5.2 | 3.6 | 0.26 | 0.3 | 18 | 11 |
| B8 | 5.0 | 3.4 | 0.23 | 0.2 | 15 | 12 |
| A31 | 4.9 | 3.3 | 0.25 | 0.3 | 18 | 20 |
| A32 | 4.8 | 3.2 | 0.26 | 0.25 | 18 | 22 |
| A33 | 4.7 | 3.1 | 0.24 | 0.2 | 15 | 22 |
| A34 | 4.6 | 3.0 | 0.24 | 0.2 | 16 | 21 |
| A35 | 4.5 | 2.9 | 0.25 | 0.2 | 15 | 20 |
| A36 | 4.4 | 2.8 | 0.25 | 0.2 | 14 | 10 |
| A37 | 4.2 | 2.6 | 0.24 | 0.2 | 14 | 7 |

AA-size nickel hydride alkaline batteries of positive electrode-dominating type (battery capacity: 1,200±10 mAh) A30 through A37 were prepared in the same manner as in Examples 1 through 13 except for using these hydrogen-absorbing powders as hydrogen-absorbing material.

Anti-Overcharge Characteristics

Batteries A30 through A37 were activated by charging at 1 20 mA at room temperature (about 25° C.) for 16 hours and then discharging at 60° C. and 120 mA to 0.95 V.

The batteries were then each subjected to a charge-discharge cycle test which repeals cycles, one cycle consisting of charging at 40° C. and at 240 mA (0.2C) for 10 days, resting for 1 hour to permit the circumferential temperature to return to room temperature and discharging at 1,200 mA to 1.0 V. In the test, the number of charge-discharge cycles required for the discharge capacity to decrease to 80% of that at the first cycle, or below, was recorded. For each battery, this required number of charge-discharge cycles was obtained on 10 pieces and, after exclusion of the largest and smallest numbers of cycles, the average of the remaining 8 numbers was taken as an index of the anti-overcharge characteristics. The results are also shown in the above Table 6, which includes the results obtained on Battery A8.

As seen from Table 6, Batteries A31 through A35, using alloys having a stoichiometric ratio x of 4.5 to 4.9, have far better anti-overcharge characteristics than those of other batteries using alloys having an x deviating from this range. The poor anti-overcharge characteristics of Batteries A30 and A8 are attributable to the fact that the alloys cracked and hence the oxygen consumption activity decreased, so that the electrolyte leaked out. The poor anti-overcharge characteristics of Batteries A36 and A37 are attributable to the fact that there was formed, different from mother phase, a second phase ($Mm_2R_7$ phase) in which oxygen consumption reaction did not proceed smoothly on overcharge, so that oxidation of the alloys was promoted. To summarize this result and the previous results, it is understood that use, as hydrogen-absorbing material, of an alloy powder obtained by pulverizing a thin strip-like Mm.Ni.Co.Al.Mn alloy having an average thickness of 0.08 to 0.35 mm prepared by single roll process and represented by general formula MmRx (Mm: misch metal; R: Ni, Co, Al and Mn; x is 4.5 to 4.9) and having a minimum crystal grain size of the roll-surface side of at least 0.2 μm and a maximum crystal grain size of the open-surface side of not more than 18 μm can yield a hydrogen-absorbing alloy electrode which will provide metal hydride alkaline batteries being excellent not only in high-rate discharge characteristics at an initial period of charge-discharge cycles and charge-discharge cycle characteristics but in anti-overcharge characteristics.

Relationship Between the Molar Ratio Between Co and Mm and Anti-Overcharge Characteristics Metals (all having a purity of at least 99.9%) constituting the alloys to prepare were each weighed and mixed together and the obtained mixtures were melted under vacuum in a high-frequency melting furnace. The melts were cooled by single roll process (roll diameter: 350 mm) at a roll surface speed of 300 cm/sec, to give 8 types of thin strip-like Mm.Ni.Co.Al.Mn alloys represented by the following composition formulas: $MmNi_{2.8}Co_{1.1}Al_{0.3}Mn_{0.5}$ (molar ratio of Co to Mm: 1.1), $MmNi_{2.95}Co_{0.95}Al_{0.3}Mn_{0.5}$ (molar ratio of Co to Mm: 0.95), $MmNi_{3.0}Co_{0.9}Al_{0.3}Mn_{0.5}$ (molar ratio of Co to Mm: 0.9), $MmNi3.2Co_{0.7}Al_{0.3}Mn0.5$ (molar ratio of Co to Mm: 0.7), $MmNi_{3.3}Co_{0.6}Al_{0.3}Mn_{0.5}$ (molar ratio of Co to Mm: 0.6), $MmNi_{3.4}Co_{0.5}Al_{0.3}Mn_{0.5}$ (molar ratio of Co to Mm: 0.5), $MmNi_{3.5}Co_{0.4}Al_{0.3}Mn_{0.5}$ (molar ratio of Co to Mm: 0.4) and $MmNi_{3.55}Co_{0.35}Al_{0.3}Mn_{0.5}$ (molar ratio of Co to Mm: 0.35).

The thin strip-like Mm.Ni.Co.Al.Mn alloys thus obtained were annealed at 900° C. in argon for 6 hours and then mechanically pulverized under an atmosphere of all inert gas (argon), to give alloy powders having an average particle diameter of 70 μm. Table 7 shows the molar ratio of Co to Mm, the thickness of thin strips and the maximum and minimum crystal grain sizes, of the alloys thus prepared.

TABLE 7

| Battery | Molar ratio of Co to Mm | Thickness of thin strips (mm) | Size of crystal grain (μm) min. | Size of crystal grain (μm) max. | Average of charge-discharge cycles (times) | High-rate discharge capacity (mAh) |
|---|---|---|---|---|---|---|
| A38 | 1.1 | 0.25 | 0.2 | 17 | 24 | 770 |
| A39 | 0.95 | 0.24 | 0.2 | 16 | 24 | 810 |
| A40 | 0.9 | 0.25 | 0.2 | 16 | 23 | 930 |
| A33 | 0.8 | 0.24 | 0.2 | 15 | 22 | 960 |
| A41 | 0.7 | 0.24 | 0.2 | 15 | 20 | 970 |
| A42 | 0.6 | 0.23 | 0.2 | 14 | 20 | 980 |
| A43 | 0.5 | 0.24 | 0.2 | 16 | 19 | 1000 |
| A44 | 0.4 | 0.23 | 0.2 | 15 | 11 | 1000 |
| A45 | 0.35 | 0.24 | 0.2 | 14 | 9 | 1000 |

AA-size nickel hydride alkaline batteries of positive electrode-dominating type (battery capacity: 1,200|10 mAh) A38 through A45 were prepared in the same manner as in Examples 1 through 13 except for using these hydrogen-absorbing powders as hydrogen-absorbing material.

The batteries were then each subjected to the high-rate discharge test and an anti-overcharge characteristics test under the same conditions as above, to be tested for the high-rate discharge characteristics at an initial period of charge-discharge cycles and the anti-overcharge characteristics. The results are also shown in the above Table 7, which includes the results obtained on Battery A33 as copied from Table 6.

It is understood from Table 7 that: with use of Mm.Ni.Co.Al.Mn alloy, it is desirable, for obtaining a hydrogen-absorbing alloy electrode capable of providing nickel hydride alkaline batteries which are excellent not only in high-rate discharge characteristics at an initial period of charge-discharge cycles but in anti-overcharge characteristics, to use an Mm.Ni.Co.Al.Mn alloy containing Co in an amount of 0.5 to 0.9 mole per mole of Mm. Batteries A38 and A39, using alloys having a molar ratio of Co to Mm exceeding 0.9, have too small a specific surface area of alloy powders, thereby having a small high-rate discharge capacity. Batteries A44 and A45, using alloys having a molar ratio of Co to Mm of less than 0.5, are readily crackable into fine pieces and hence have poor anti-overcharge characteristics, although they have a large high-rate discharge capacity thanks to the large specific area of the powders.

Relationship Between the Annealing Temperature and the Anti-Overcharge Characteristics Metals (all having a purity of at least 99.9%) constituting the alloy to prepare were each weighed and mixed together and the obtained mixture were melted under vacuum in a high-frequency melting furnace. The melt was cooled by single roll process (roll diameter: 350 mm) at a roll surface speed of 300 cm/sec, to give a thin strip-like Mm.Ni.Co.Al.Mn alloy represented by the composition formula $MmNi_{3.1}Co_{0.8}Al_{0.3}Mn_{0.5}$ (molar ratio of Co to Mm: 0.8).

The thin strip-like Mm.Ni.Co.Al.Mn alloy thus obtained was annealed at various temperatures (700°, 750°, 800°, 950° or 1,000° C.) in argon for 6 hours and then mechanically pulverized under an atmosphere of an inert gas (argon), to give alloy powders having an average particle diameter of 70 μm. Table 8 shows the annealing temperature, the thickness of thin strips and the maximum and minimum crystal grain sizes, of the alloys thus prepared.

TABLE 8

| Battery | Annealing temperature (°C.) | Thickness of thin strips (mm) | Size of crystal grain (μm) min. | Size of crystal grain (μm) max. | Average of charge-discharge cycles (times) |
|---|---|---|---|---|---|
| A46 | 700 | 0.24 | 0.2 | 15 | 14 |
| A47 | 750 | 0.24 | 0.2 | 16 | 20 |
| A48 | 800 | 0.24 | 0.2 | 15 | 22 |
| A33 | 900 | 0.24 | 0.2 | 15 | 22 |
| A49 | 950 | 0.24 | 0.25 | 15 | 21 |
| A50 | 1,000 | 0.24 | 0.3 | 15 | 15 |

AA-size nickel hydride alkaline batteries of positive electrode-dominating type (battery capacity: 1,200±10 mAh) A46 through A50 were prepared in the same manner as in Examples 1 through 13 except for using these hydrogen-absorbing powders as hydrogen-absorbing material.

The batteries were then each subjected to the anti-overcharge characteristics test under the same conditions as above, in order to study the anti-overcharge characteristics. The results are also shown in the above Table 8, which includes the results obtained on Battery A33 as copied from Table 6.

It is understood from Table 8 that: in order to obtain a hydrogen-absorbing alloy electrode capable of providing nickel hydride alkaline batteries being excellent not only in high-rate discharge characteristics at an initial period of charge-discharge cycles and charge-discharge cycle characteristics but in anti-overcharge characteristics, it is necessary to use an Mm.Ni.Co.Al.Mn alloy annealed at a temperature of 750° to 950° C.

Obviously, numerous modifications and variations of the present invention are possible in light of the above teachings. It is therefore to be understood that within the scope of the appended claims, the invention may be practiced otherwise than as specifically described herein.

What is claimed is:

1. A hydrogen-absorbing alloy electrode for metal hydride alkaline batteries, comprising a powder of a rare earth element-nickel hydrogen-absorbing alloy obtained by pulverizing strips of said alloy prepared by a single roll process and having a laminar structure of alternating layers of high concentration of rare earth elements and low concentration of rare earth elements, and having an average thickness of 0.08 to 0.35 mm and a minimum size of crystal grains present in the roll-surface side of at least 0.2 μm and a maximum size of crystal grains in the open-surface side of not more than 20 μm, wherein the size of crystal grains is the sum of the thicknesses of two neighboring layers of high concentration of rare earth elements and low concentration of rare earth elements.

2. The hydrogen-absorbing alloy electrode for metal hydride alkaline batteries according to claim 1, wherein said powder has an average particle diameter of 25 to 70 μm.

3. The hydrogen-absorbing alloy electrode for metal hydride alkaline batteries according to claim 1, wherein said powder is obtained by pulverizing said rare earth element-nickel hydrogen-absorbing alloy and then surface-treating the resulting powder by immersion in an acid solution and has an average particle diameter of 25 to 60 μm.

4. The hydrogen-absorbing alloy electrode for metal hydride alkaline batteries according to any one of claim 1 through claim 3, wherein said rare earth element-nickel hydrogen-absorbing alloy is an Mm.Ni.Co.Al.Mn alloy represented by the general formula MmRx wherein Mm represents misch metal; R represents Ni, Co, Al and Mn; and x is 4.4 to 5.2).

5. The hydrogen-absorbing alloy electrode for metal hydride alkaline batteries according to claim 4, wherein said Mm.Ni.Co.Al.Mn alloy contains Co in an amount of 0.4 to 0.9 mole per mole of Mm.

6. The hydrogen-absorbing alloy electrode for metal hydride alkaline batteries according to claim 4, wherein said Mm.Ni.Co.Al.Mn alloy contains Ni in an amount of 2.8 to 3.6 moles per mole of Mm.

7. The hydrogen-absorbing alloy electrode for metal hydride alkaline batteries according to claim 4, wherein said Mm.Ni.Co.Al.Mn alloy contains Co and Ni in an amount or 0.4 to 0.9 mole and 2.8 to 3.6 moles, respectively, per mole of Mm.

8. A hydrogen-absorbing alloy electrode for metal hydride alkaline batteries, comprising a powder of an Mm.Ni.Co.Al.Mn alloy represented by the general formula MmRx, wherein Mm represents misch metal; R represents Ni, Co, Al and Mn; and x is 4.5 to 4.9, obtained by pulverizing strips of said alloy prepared by single roll process and having a laminar structure of alternating layers of high concentration of rare earth elements and low concentration of rare earth elements, and having an average thickness of 0.08 to 0.35 mm and a minimum size of crystal grains present in the roll-surface side of at least 0.2 μm and a maximum size of crystal grains in the open-surface side of not more than 18 μm, wherein the size of crystal grains is the sum of the thicknesses of two neighboring layers of high concentration of rare earth elements and low concentration of rare earth elements.

9. The hydrogen-absorbing alloy electrode for metal hydride alkaline batteries according to claim 8, wherein said powder has an average particle diameter of 25 to 70 μm.

10. The hydrogen-absorbing alloy electrode for metal hydride alkaline batteries according to claim 8, wherein said powder is obtained by pulverizing said Mm.Ni.Co.Al.Mn alloy and then surface-treating the resulting powder by immersion in an acid solution and has an average particle diameter of 25 to 60 μm.

11. The hydrogen-absorbing alloy electrode for metal hydride alkaline batteries according to claim 8, wherein said Mm.Ni.Co.Al.Mn alloy contains Co in an amount of 0.5 to 0.9 mole per mole of Mm.

12. The hydrogen-absorbing alloy electrode for metal hydride alkaline batteries according to claim 8, wherein said Mm.Ni.Co.Al.Mn alloy contains Ni in an amount of 2.9 to 3.3 moles per mole of Mm.

13. The hydrogen-absorbing alloy electrode for metal hydride alkaline batteries according to claim 8, wherein said Mm.Ni.Co.Al.Mn alloy contains Co and Ni in an amount of 0.5 to 0.9 mole and 2.9 to 3.3 moles, respectively, per mole of Mm.

14. A process for producing hydrogen-absorbing alloy electrodes for metal hydride alkaline batteries, which comprises the steps of: preparing strips of rare earth element-nickel hydrogen-absorbing alloy by permitting a melt of the alloy to flow onto the peripheral surface of a single roll rotating at a surface speed of 50 to 1,000 cm/sec in an inert gas or under vacuum; annealing said strips of rare earth element-nickel hydrogen-absorbing alloy in an inert gas or under vacuum at a temperature of 620° to 1,000° C.; pulverizing the annealed strips of rare earth element-nickel hydrogen-absorbing alloy into a power of the alloy; and preparing an electrode by using the obtained alloy powder as hydrogen-absorbing material.

15. The process for producing hydrogen-absorbing alloy electrodes for metal hydride alkaline batteries according to claim 14, wherein said powder has an average particle diameter of 25 to 70 μm.

16. The process for producing hydrogen-absorbing alloy electrodes for metal hydride alkaline batteries according to claim 14, wherein said annealed and pulverized rare earth element-nickel hydrogen-absorbing alloy is further surface-treated by immersion in an acid solution such that the surface-treated alloy powder has an average particle diameter of 25 to 60 μm.

17. The process for producing hydrogen-absorbing alloy electrodes for metal hydride alkaline batteries according to any one of claim 14 through claim 16, wherein said rare earth element-nickel hydrogen-absorbing alloy is an Mm.Ni.Co.Al.Mn alloy represented by the general formula MmRx wherein Mm represents misch metal; R represents Ni, Co, Al and Mn; and x is 4.4 to 5.2.

18. The process for producing hydrogen-absorbing alloy electrodes for metal hydride alkaline batteries according to claim 17, wherein said Mm.Ni.Co.Al.Mn alloy contains Co in an amount of 0.4 to 0.9 mole per mole of Mm.

19. The process for producing hydrogen-absorbing alloy electrodes for metal hydride alkaline batteries according to claim 17, wherein said Mm.Ni.Co.Al.Mn alloy contains Ni in an amount of 2.8 to 3.6 moles per mole of Mm.

20. The process for producing hydrogen-absorbing alloy electrodes for metal hydride alkaline batteries according to claim 17, wherein said Mm.Ni.Co.Al.Mn alloy contains Co and Ni in an amount of 0.4 to 0.9 mole and 2.8 to 3.6 moles, respectively, per mole of Mm.

21. A process for producing hydrogen-absorbing alloy electrodes for metal hydride alkaline batteries, which comprises the steps of: preparing strips of Mm.Ni.Co.Al.Mn alloy represented by the general formula MmRx, wherein Mm represents misch metal; R represents Ni, Co, Al and Mn; and x is 4.5 to 4.9, by permitting a melt of the alloy to flow onto the peripheral surface of a single roll rotating at a surface speed of 50 to 1,000 cm/sec in an inert gas or under vacuum; annealing said strips of Mm.Ni.Co.Al.Mn alloy in an inert gas or under vacuum at a temperature of 750° to 950° C.; pulverizing the annealed alloy strips into a powder of the alloy; and preparing an electrode by using the obtained alloy powder as hydrogen-absorbing material.

22. The process for producing hydrogen-absorbing alloy electrodes for metal hydride alkaline batteries according to claim 21, wherein said powder has an average particle diameter of 25 to 70 μm.

23. The process for producing hydrogen-absorbing alloy electrodes for metal hydride alkaline batteries according to claim 21, wherein said annealed and pulverized Mm.Ni.Co.Al.Mn alloy is further surface-treated by immersion in an acid solution such that the surface-treated alloy powder has an average particle diameter of 25 to 60 μm.

24. The process for producing hydrogen-absorbing alloy electrodes for metal hydride alkaline batteries according to any one of claim 21 through claim 23, wherein said Mm.Ni.Co.Al.Mn alloy contains Co in an amount of 0.5 to 0.9 mole per mole of Mm.

25. The process for producing hydrogen-absorbing alloy electrodes for metal hydride alkaline batteries according to any one of claim 21 through claim 23, wherein said Mm.Ni.Co.Al.Mn alloy contains Ni in an amount of 2.9 to 3.3 moles per mole of Mm.

26. The process for producing hydrogen-absorbing alloy electrodes for metal hydride alkaline batteries according to any one of claim 21 through claim 23, wherein said Mm.Ni.Co.Al.Mn alloy contains Co and Ni in an amount of 0.5 to 0.9 mole and 2.9 to 3.3 moles, respectively, per mole of Mm.

* * * * *